(12) United States Patent
Nauseda et al.

(10) Patent No.: US 7,650,805 B2
(45) Date of Patent: Jan. 26, 2010

(54) INTEGRITY TESTABLE MULTILAYERED FILTER DEVICE

(75) Inventors: Curtis Nauseda, Maynard, MA (US);
Kari Backes, Westford, MA (US);
Kevin Rautio, Manchester-By-The-Sea, MA (US)

(73) Assignee: Millipore Corporation, Billerica, MA (US)

(*) Notice: Subject to any disclaimer, the term of this patent is extended or adjusted under 35 U.S.C. 154(b) by 331 days.

(21) Appl. No.: 11/540,856

(22) Filed: Sep. 29, 2006

(65) Prior Publication Data
US 2007/0079649 A1    Apr. 12, 2007

Related U.S. Application Data

(60) Provisional application No. 60/725,423, filed on Oct. 11, 2005, provisional application No. 60/728,914, filed on Oct. 21, 2005.

(51) Int. Cl.
*G01N 19/00*    (2006.01)

(52) U.S. Cl. ...................... 73/865.9; 210/300

(58) Field of Classification Search ...................... 73/38; 210/300
See application file for complete search history.

(56) References Cited

U.S. PATENT DOCUMENTS

| 3,984,044 | A | * | 10/1976 | Breton et al. | ................ | 228/198 |
| 4,515,007 | A | | 5/1985 | Herman | | |
| 4,940,562 | A | * | 7/1990 | Watanabe et al. | ........... | 264/234 |
| 5,282,380 | A | | 2/1994 | DiLeo et al. | | |
| 5,433,764 | A | * | 7/1995 | Matschke | ..................... | 55/511 |
| 5,457,986 | A | | 10/1995 | DiLeo et al. | | |
| 6,327,893 | B1 | | 12/2001 | Choi | | |
| 7,318,859 | B2 | * | 1/2008 | Ball et al. | ...................... | 96/121 |
| 2007/0080104 | A1 | * | 4/2007 | Rautio | ......................... | 210/338 |
| 2007/0089489 | A1 | | 4/2007 | Lewnard et al. | | |

FOREIGN PATENT DOCUMENTS

| EP | 0 640 822 A | 3/1995 |
| EP | 1 775 015 A | 4/2007 |

* cited by examiner

*Primary Examiner*—Hezron Williams
*Assistant Examiner*—Rodney T Frank

(57) ABSTRACT

The present invention comprises a filter housing having two or more layers of filters. Each layer is preferably spaced apart from each other so as to provide a chamber or gap between them. A port or vent is located within the chamber or gap between the two layers to provide an intermediate path for gas or liquid to flow through one layer of filter or membrane and out the vent or port for integrity testing.

6 Claims, 11 Drawing Sheets

US 7,650,805 B2

INTEGRITY TESTABLE MULTILAYERED FILTER DEVICE

CROSS REFERENCE TO RELATED APPLICATIONS

The present utility patent application claims the benefit of U.S. Provisional Patent Application No. 60/725,423, filed on Oct. 11, 2005 and U.S. Provisional Patent Application No. 60/728,914, filed on Oct. 21, 2005. The entire contents of which are incorporated herewith in entirety.

The present invention relates to a device containing multiple layers of filters or membrane that is capable of being integrity tested. More particularly, it relates to a device containing multiple layers of filters or membrane, each of which is capable of being integrity tested individually within an assembled device.

BACKGROUND OF THE INVENTION

Some filter devices contain two or more layers of membrane sandwiched together in order to gain certain performance characteristics such as retention. It is important that each layer remain integral and defect free throughout the assembly process and during its use.

Normally integrity testing is done to the finished product containing the multiple layers through an air diffusion test. This test wets out the membrane layers with a suitable liquid, such as water, alcohol or mixtures of the two (depending on whether the filter is hydrophilic or hydrophobic). Air at a set pressure(s) is applied to one side of the wetted membrane and air flow on the other side is measured. If the flow increase downstream is too quick or at a low pressure, this indicates that there is a defect in the filter or its sealing into the device. The problem with using this test in devices with multiple layers of membrane is that only the overall device is tested and the test can only indicate if there is a defect in all the layers. A defect in one layer may not provide one with a conclusive indication of a defect.

What is needed is a device that allows one to independently test each layer of membrane in an integrated multilayered device. The present invention allows one the ability to do so.

SUMMARY OF THE INVENTION

The present invention relates to a device having two or more separate filtration layers that can be independently tested for integrity when in an assembled device yet which allow for serial filtration through the two or more layers to obtain the desired characteristics such as retention.

In one embodiment of the present invention one uses two separate filter elements within the same housing with one sealed to the inlet and the other sealed to the outlet of the housing. A port is formed in the housing between the two filter elements. In this way, one can integrity test the first element by closing the outlet and opening the port, wetting the membrane with a suitable liquid and using a gas, gases or liquid that is flowed through the first element to the port where its flow, concentration or other such parameter is detected to provide one with an indication of integrity. The second element is tested by closing the inlet, opening the port, wetting the second element and using a gas, gases or liquid that is flowed through the second element to the port where its flow, concentration or other such parameter is detected to provide one with an indication of integrity.

The device can be formed of serial flat sheets of filter or membrane, concentrically arranged filters or membranes, preferably pleated and the like, each of which is separated from the other and has a port between the adjacent layer(s) so that an integrity test of each individual layer can be made. In multiple layered devices, the ports on either side of the membrane in question form both the inlet and outlet for the test.

IN THE DRAWINGS

FIG. 1 shows a first embodiment of the present invention in cross-sectional view.

FIGS. 2A-C show the operation of the first embodiment of the present invention in cross-sectional view.

Figure 6A:
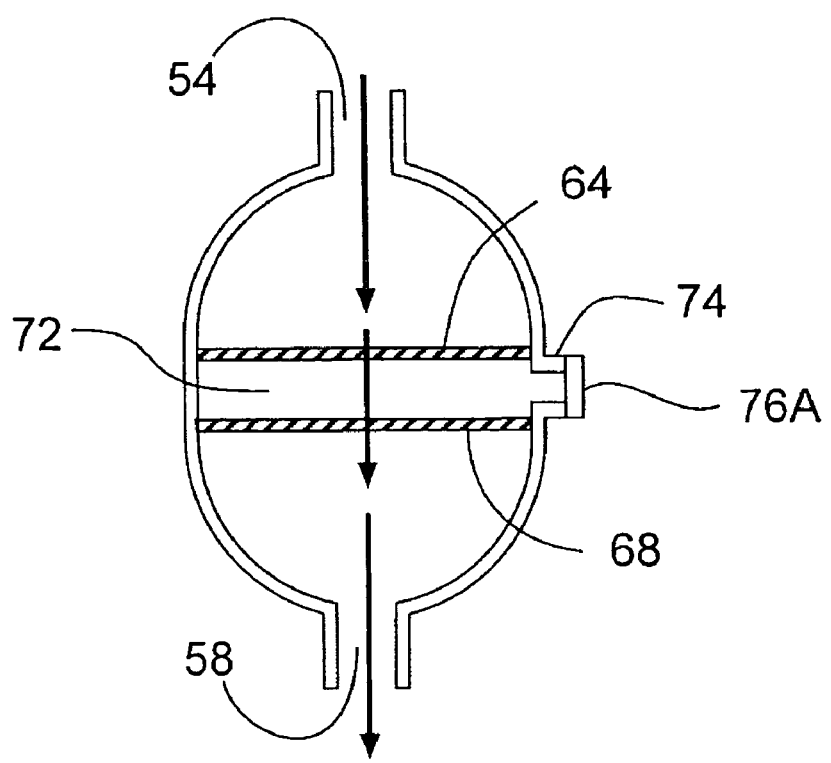
Figure 6B:
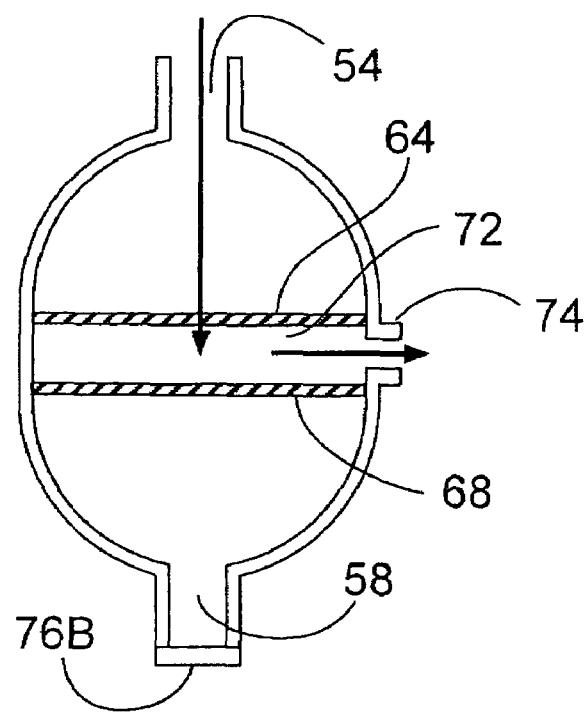
Figure 6C:
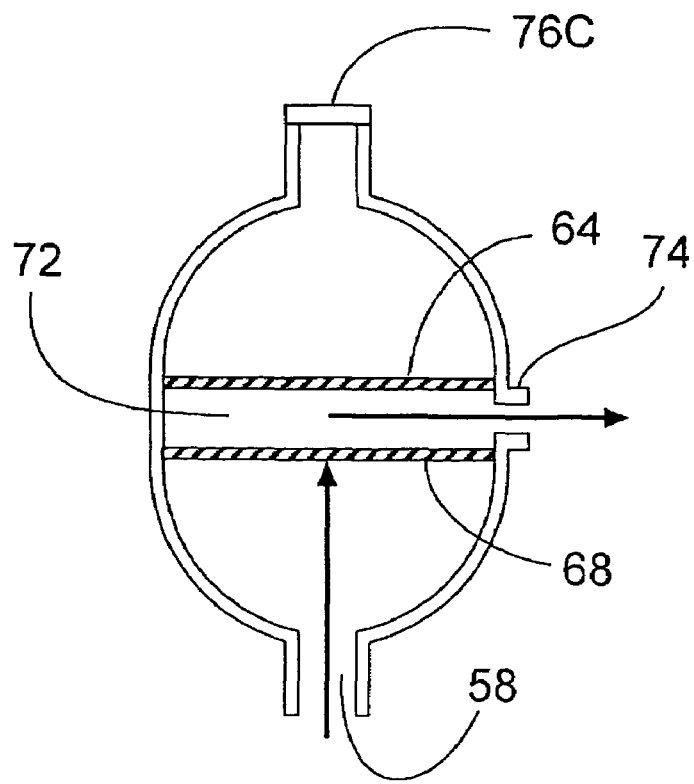

FIGS. 6A-C show the operation of the third embodiment of the present invention in cross-sectional view.

Figure 7:
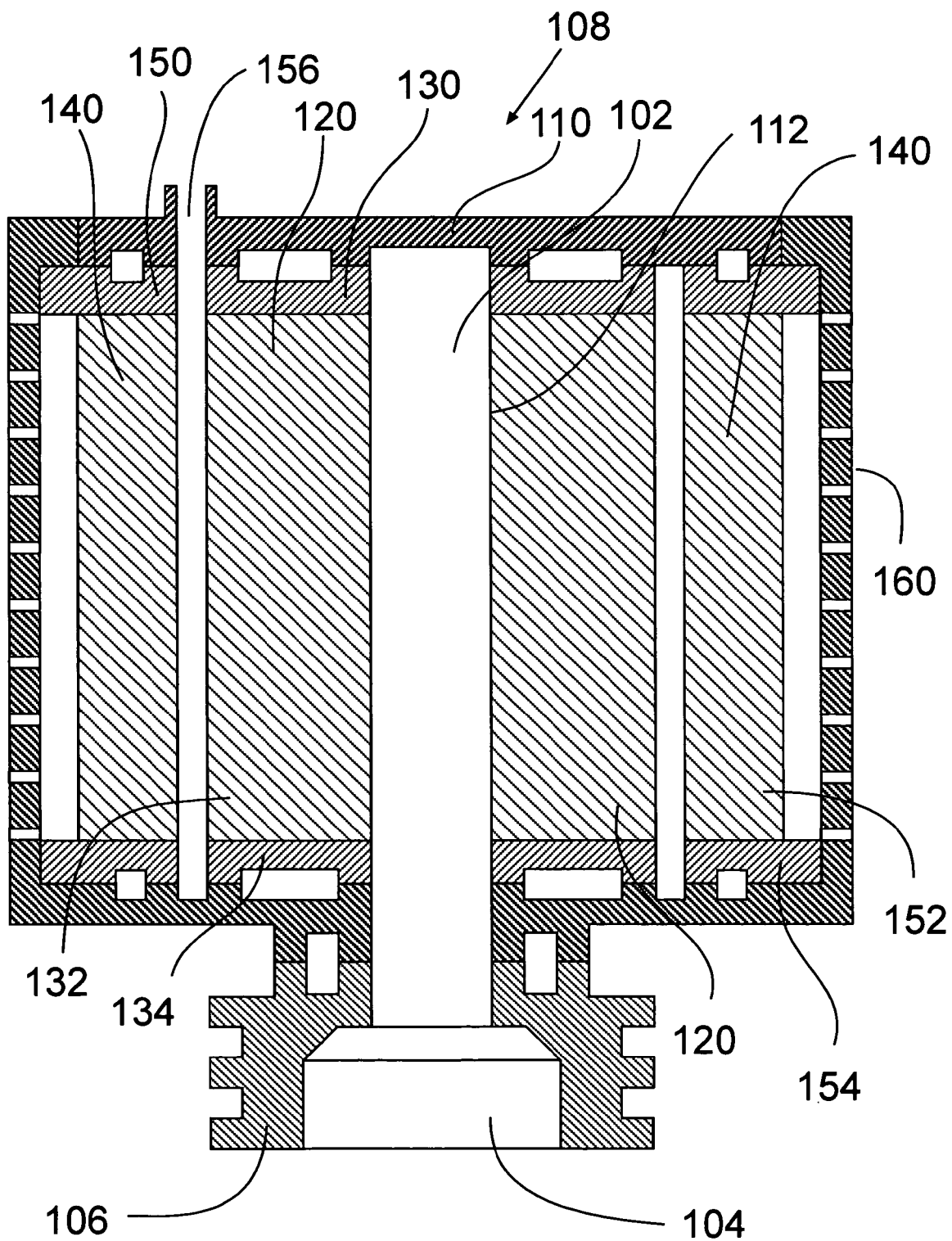

FIG. 7 shows another embodiment of the present invention.

Figure 8:
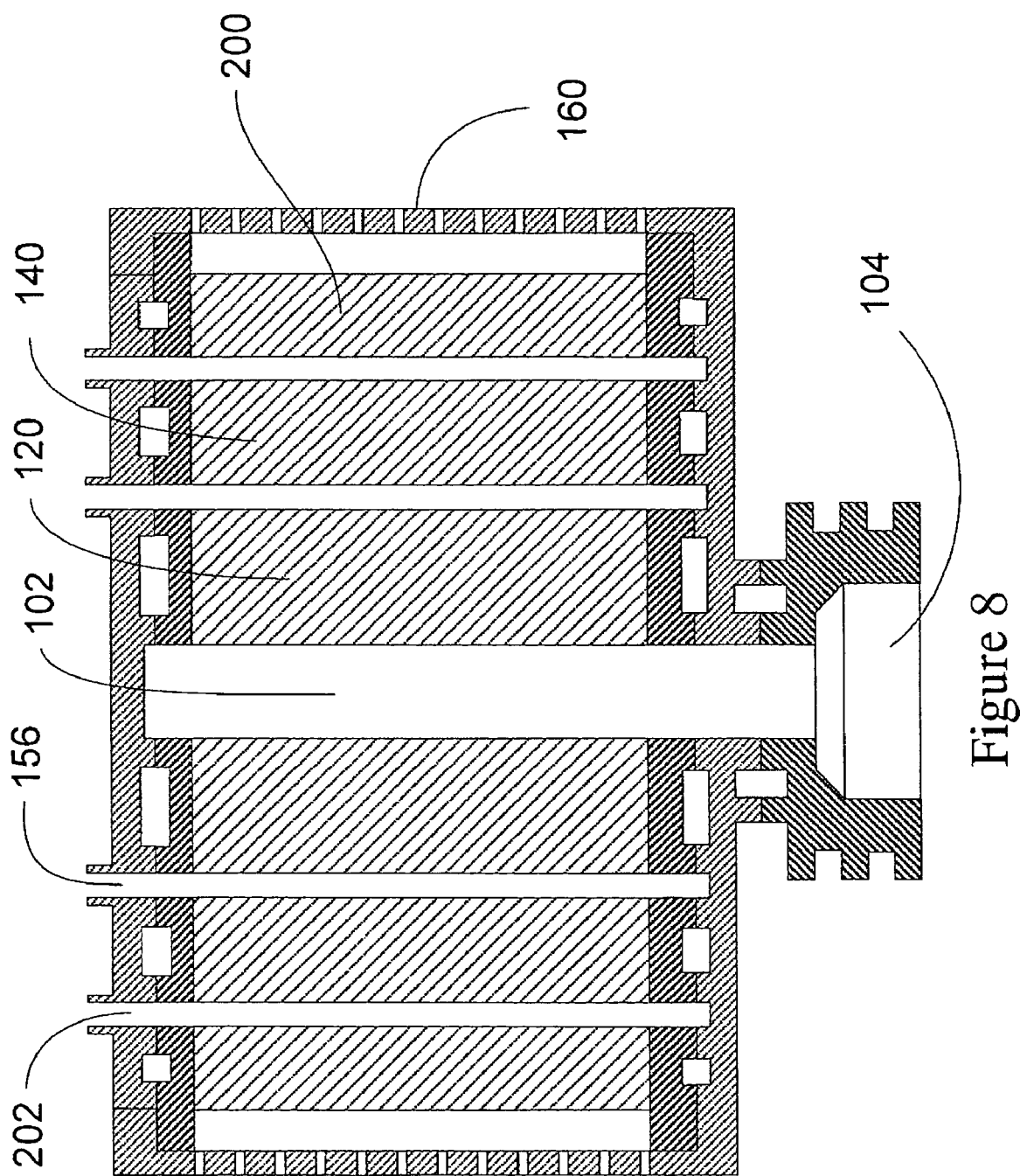

FIG. 8 shows a further embodiment of the present invention.

Figure 9A:
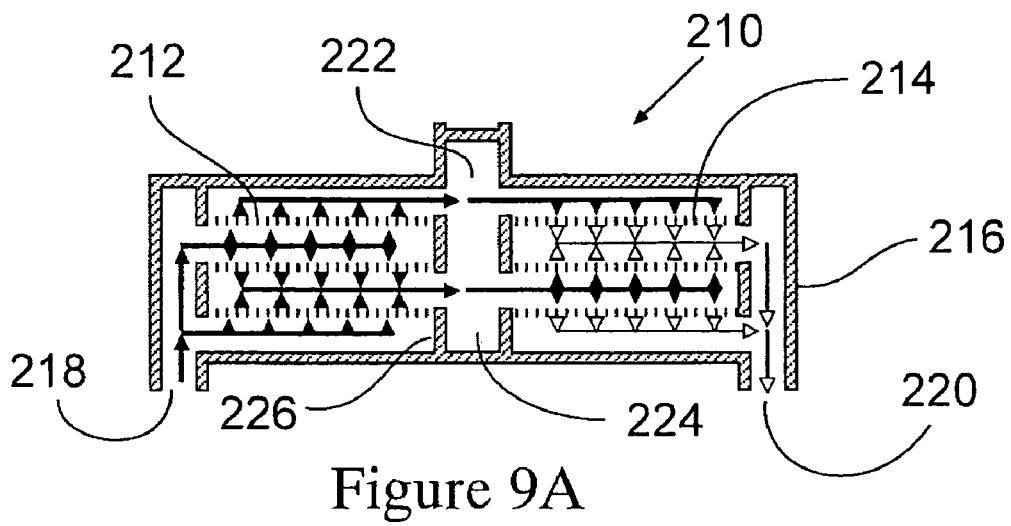
Figure 9B:
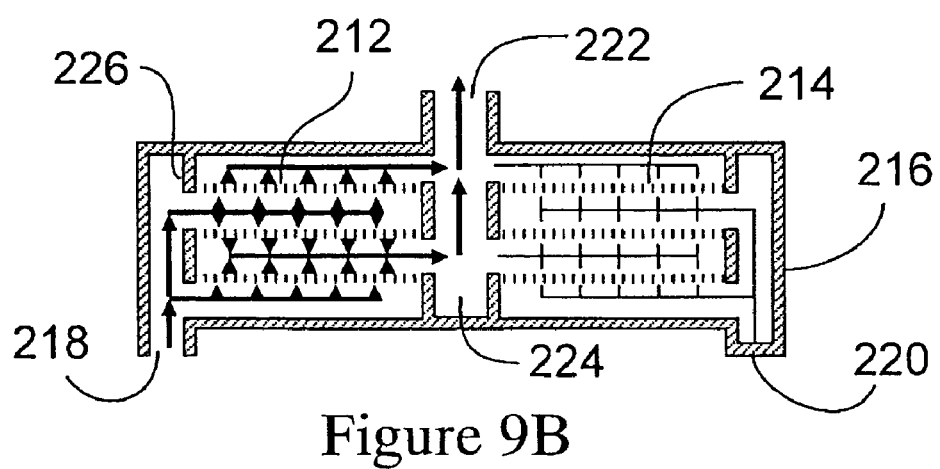
Figure 9C:
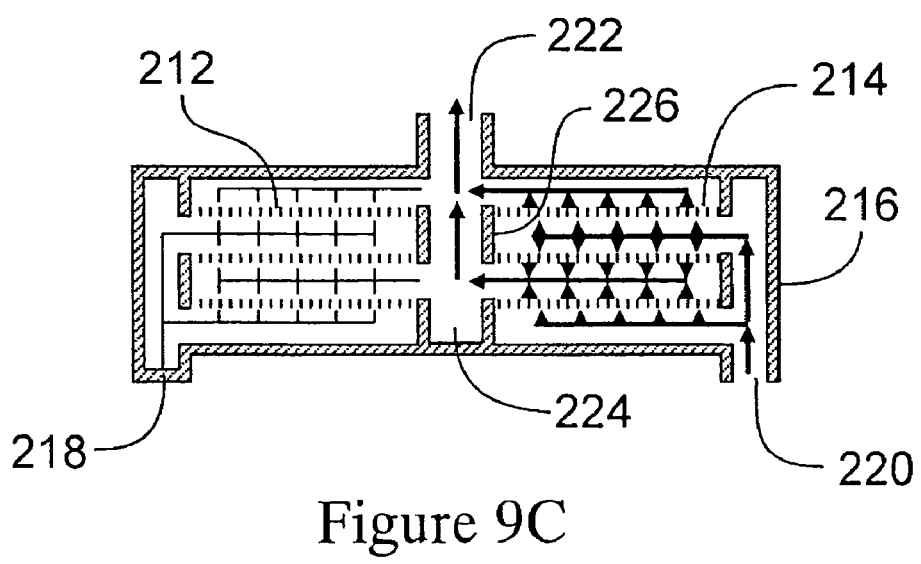

FIGS. 9A-C show an additional embodiment of the present invention in cross-sectional view.

Figure 10:
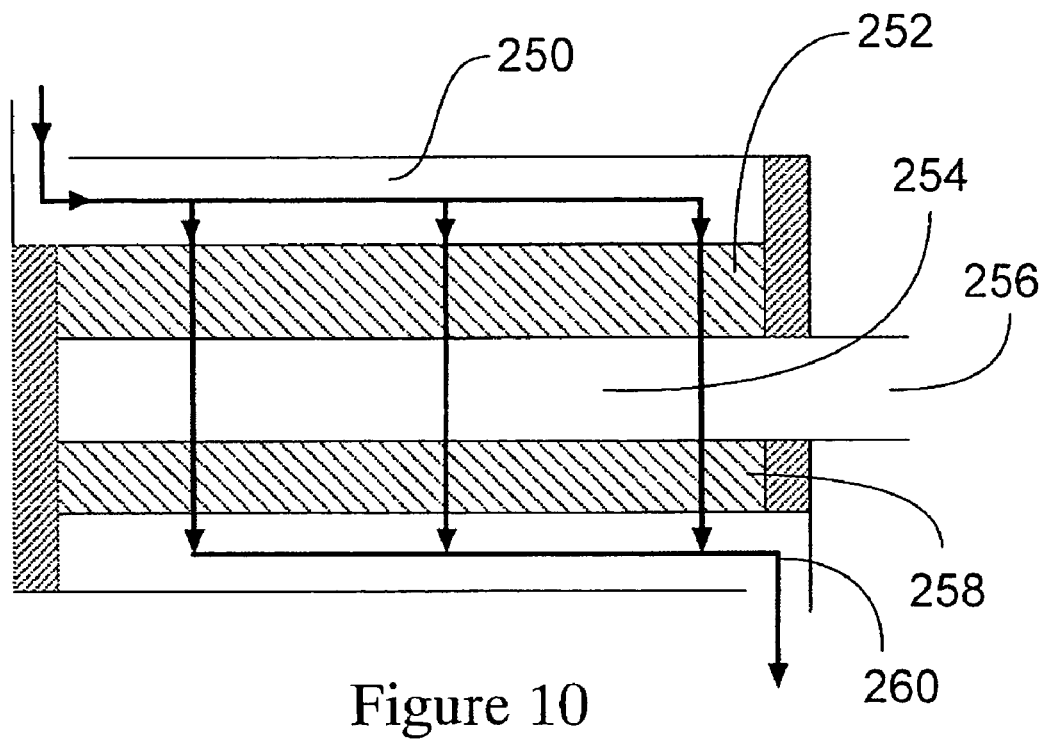

FIG. 10 shows a further embodiment of the present invention in cross-sectional view.

Figure 11:
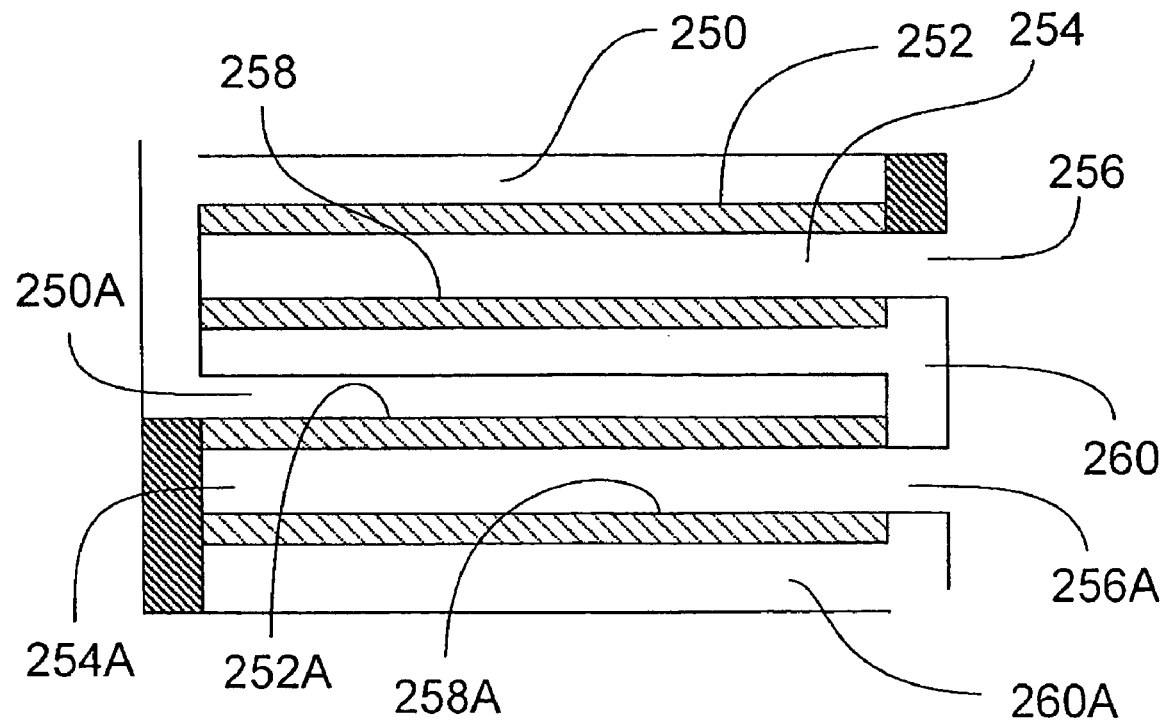

FIG. 11 shows the embodiment of FIG. 10 with multiple layers.

DETAILED DESCRIPTION OF THE INVENTION

The present invention comprises a filter housing having two or more layers of filters. Each layer is preferably spaced apart from each other so as to provide a chamber or gap between them. A port or vent is located within the chamber or gap between the two layers to provide an intermediate path for gas or liquid to flow through one layer of filter or membrane and out the vent or port for integrity testing.

Figure 1:
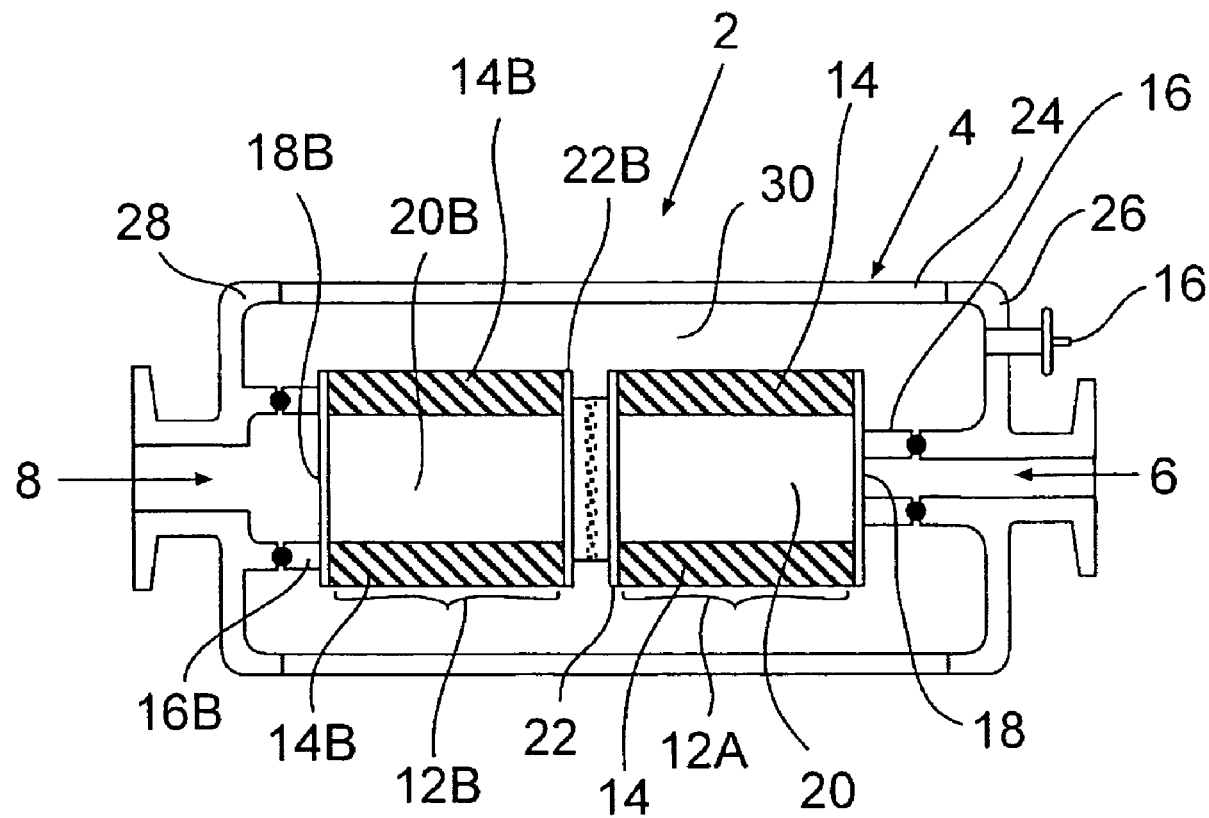

FIG. 1 shows a first embodiment of the present invention. The device 2 is comprised of a housing 4 having an inlet, 6, an outlet 8 and a vent 10 and two or more filtration layers 12 A and B (in this instance two are shown). The first filtration layer 12A is liquid tightly sealed to the inlet of the housing 4.

As shown, the first layer 12A has a filter element 14, preferably a pleated filter element as shown, a first endcap 16 sealed to a first end of the filter element 12A and having an opening 18 in fluid communication with the inlet 6 of the housing 4 and a central core 20 that is porous to allow for fluid communication between the opening and the filter element 14. The other end of the filter element 14 is sealed to a closed second endcap 22.

As shown, the second layer 12B has a filter element 14B, preferably a pleated filter element as shown, a first endcap 16B sealed to a first end of the filter element 12B and having an opening 18B in fluid communication with the outlet 8 of the housing 4 and a central core 20B that is porous to allow for fluid communication between the opening 18B and the filter element 14B. The other end of the filter element 14B is sealed to a closed second endcap 22B. Preferably the two closed endcaps 22 and 22B are sealed to each other although they do not need to be so.

Also as shown, the housing may be formed of two or more pieces for assembly purposes. In the first embodiment, the housing 4 is of three pieces, a main body 24 and two housing endcaps 26 and 28 that contain the inlet 6 and outlet 8 respectively. The pieces 24-28 are liquid tightly sealed together such as by thermal or ultrasonic bonding, solvent bonding, overmolding, adhesives and the like as are well-known in the industry.

Figure 2A:
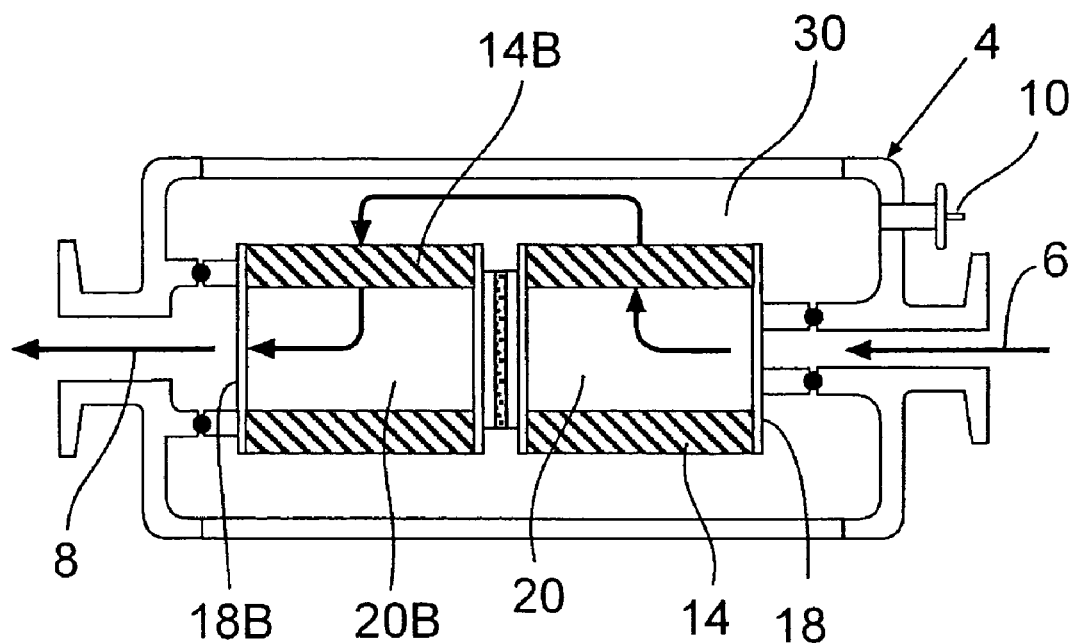
Figure 2B:
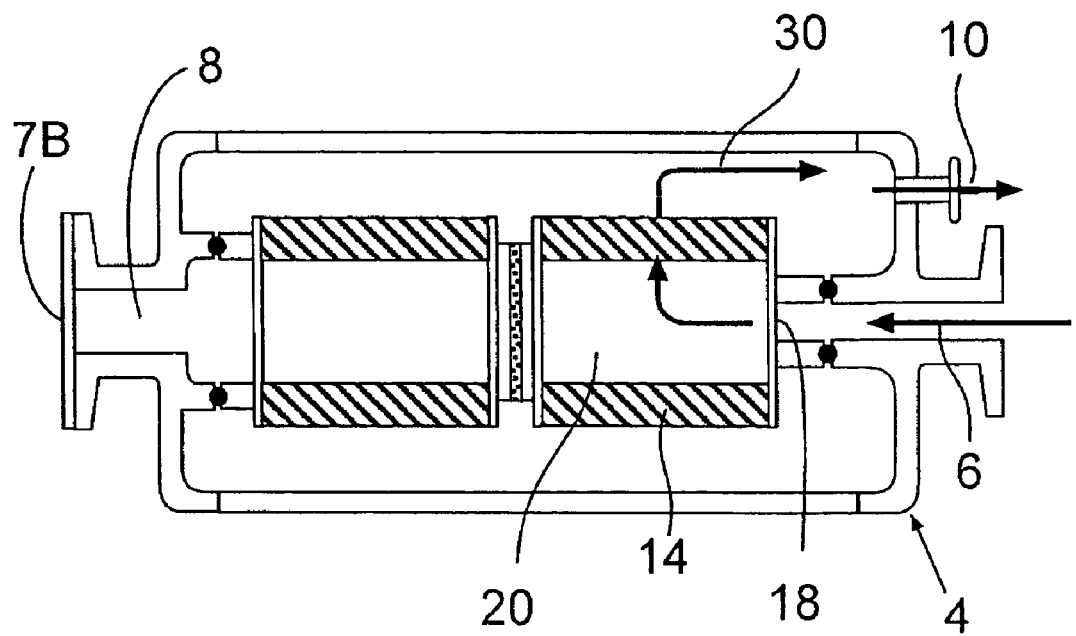
Figure 2C:
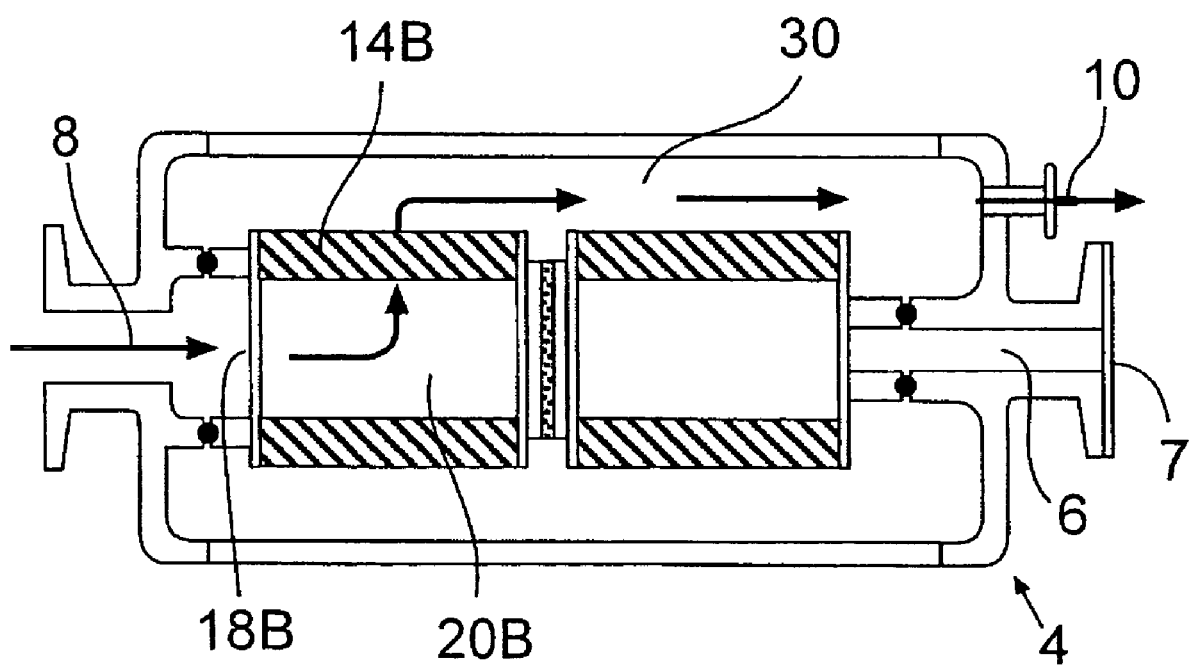

Once assembled, the device needs to be integrity tested. FIGS. 2A-C show how this is done.

In FIG. 2A, the normal filtration flow is shown by the arrows. Fluid enters the inlet 6 into opening 18 of the first layer and then into the core 20. Fluid then passes through the filter element 14 leaving behind any contaminant that the filter is designed to remove by such well-known processes as size exclusion, adsorption, philicity/phobicity or charge repellation. Fluid exits the first element and enters the inner bore of the housing 30. It then enters the second filter layer 14B passing through to the core 20B out through the opening 18B and into the outlet 8 by which it leaves the housing 4. As with the first layer, fluid passing through the filter element 14B leaves behind any contaminant that the filter is designed to remove by such well-known processes as size exclusion, adsorption, philicity/phobicity or charge repellation. The filter may be the same as the first layer or if desired it may be different in size exclusion characteristics, adsorptive capabilities and the like.

To integrity test the first layer, the set up of FIG. 2B is used. Here the first filter layer 14 is wetted with a suitable liquid for the gas or gases to be used. The outlet 8 is then closed (as shown by cap 7B although other means such as a valve (not shown) or the like may be used) and the vent 10 is opened and connected to a suitable detection device (not shown). One or more selected gases or liquids are flowed through the inlet 6 at a predetermined pressure or series of pressures and the change in flow or gas concentration (explained below) is measured by the detection device that has been coupled to the vent 10. If desired, the test can also be performed in reverse for all embodiments, in the vent and out the "inlet" or "outlet" depending upon the fitration element being tested To test the integrity of the second layer 14B, the set up of FIG. 2C is used. Here the second filter layer 14B is wetted with a suitable liquid for the gas or gases to be used. The inlet 6 is then closed (as shown by cap 7 although other means such as a valve (not shown) or the like may be used) and the vent 10 is opened and connected to a suitable detection device (not shown). One or more selected gases are flowed through the outlet 8 at a predetermined pressure or series of pressures and the change in flow or gas concentration (explained below) is measured by the detection device that has been coupled to the vent 10.

One can then compare the tested value of each layer to the value or range of acceptable values provided by the manufacturer to determine whether each layer is integral. If so, the device may be used.

A similar process may be used after filtration of the fluid (gas or liquid) to ensure that the integrity of the device remained throughout its use by using the same process steps as described in FIGS. 2A-C.

As each layer can be independently tested for integrity one can use a conventional test such as the air/water diffusion test described in the text above. Alternatively, one can use a more sophisticated and sensitive test such as a binary gas test as claimed in a co-pending application filed this day entitled "Methods and Systems for Integrity testing of Porous Materials" by John Lewnard. In this test, the selected filter layer is wetted with a liquid that is suitable for the binary gases used. For example one can use water, alcohol, mixes of water and alcohol and the like depending upon the gases selected. Two gases are chosen such that one has a high solubility in the liquid of choice and the other has a lower solubility in that same liquid. Selected gases include but are not limited to carbon dioxide, hydrogen, helium, Freon, sulfur hexafluoride or other perfluoro gases, noble gases and the like. Carbon dioxide is a preferred high permeability gas and hydrogen, helium and prefluorocarbons gases are preferred low permeability gases for many filters. The binary gas mixture is introduced as described in FIGS. 2A-C in a predetermined amount relative to each other and the amount of one or both of the gases is measured by the detection device such as a gas chromatograph or a mass spectrometer on the downstream side of the filter layer to determine whether there is a shift in the relative amount of each gas in the detected gas stream. Where the measured amount of gas differs from the predetermined amount of gas initially added to the system, a defect is detected. If no difference in concentration is found, the layer is determined to be integral. Integral, when referring herein to a porous material, means non-defective. The predetermined amount may be, for example, the amount of gas calculated to diffuse through the integral, wetted porous material at a given temperature and pressure. The given temperature and pressure may be the temperature and pressure under which the test is conducted.

Another method of integrity testing of testing integrity is to use a liquid-liquid porometry test as shown in U.S. Pat. Nos. 5,282,380 and 5,457,986 (DiLeo) which may also be used in the present invention.

The method of integrity testing used is not critical to the invention. Any method that provides one with a suitable value of integrity and which is not destructive to the device can be used.

Figure 3:
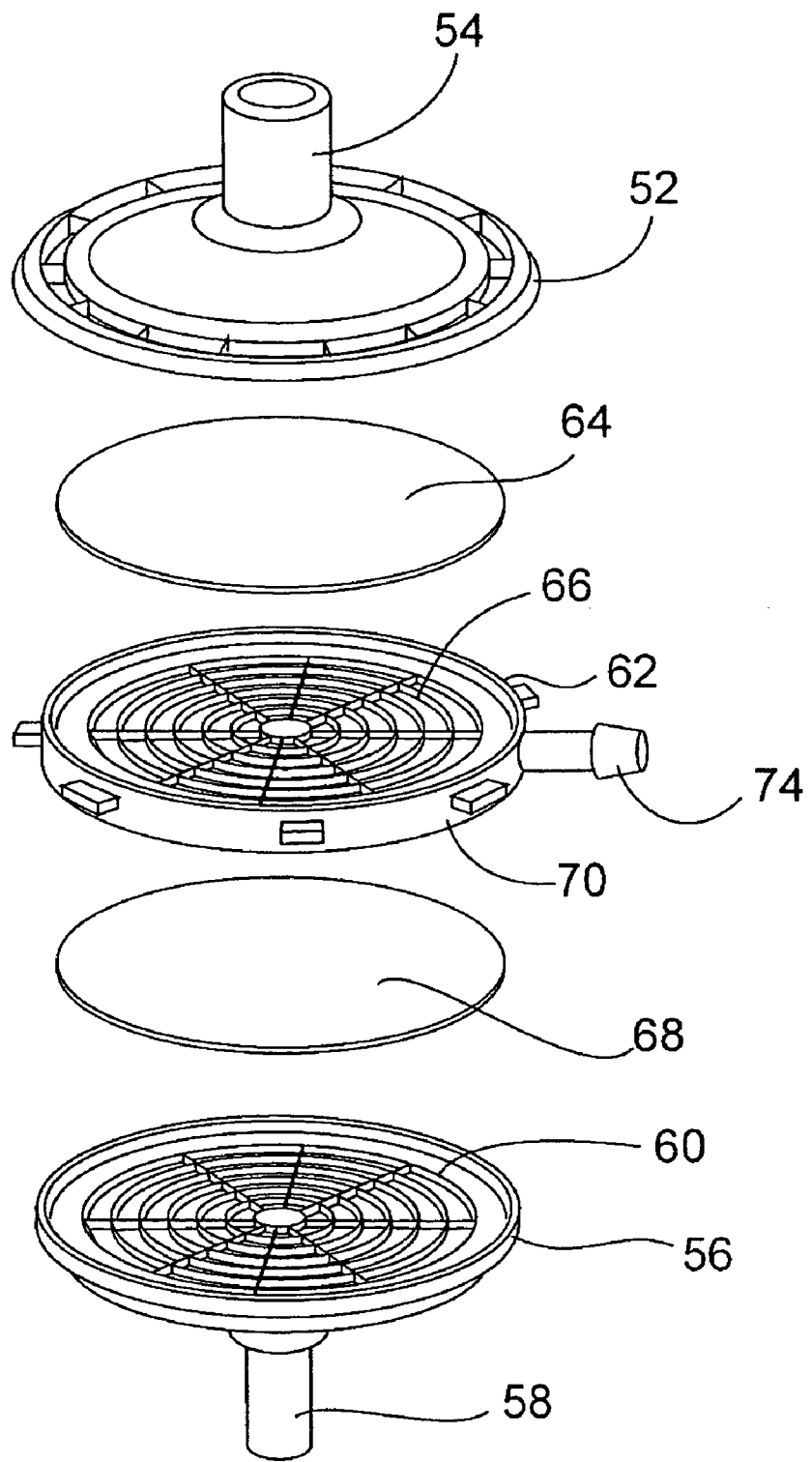
FIG. 3 shows a second embodiment of the present invention in exploded view.
Figure 4:
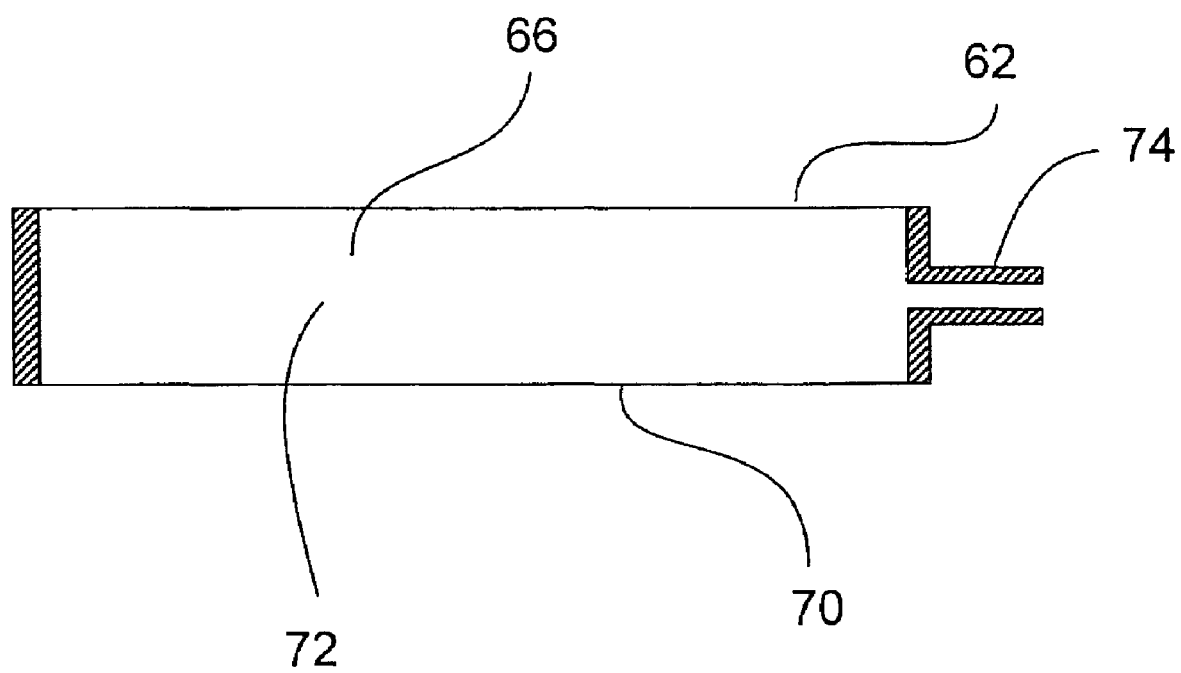
FIG. 4 shows a cross-sectional view of the spacer of FIG. 3.

FIG. 3 shows a second embodiment of the present device with two or more layers of serial filtration layers. In this embodiment, two layers are shown although additional layers with additional spacer plates may be used. The device 50 has a first housing component 52 that contains an inlet 54. There is a corresponding second housing component 56 at the other end of the device 50 that contains the outlet 58. Also as shown in the second housing component 56 is a porous membrane support grid 60. This is an optional element in the first housing component. Between the two components 52 and 56 is spacer plate 62. The spacer plate 62 has a membrane 64 adjacent and preferably on its upper surface 66 and a second membrane 68 adjacent and preferably on its lower surface 70. As shown, the upper surface 66 has porous membrane support grid and preferably the lower surface 70 has a similar structure although it is not necessarily needed on the lower surface 70. There is a chamber 72 (as shown in FIG. 4) in the spacer between its upper and lower surfaces. The two surfaces 66 and 70 and the chamber 72 are in fluid communication with each other. Also within the chamber 72 is port 74.

Figure 5:
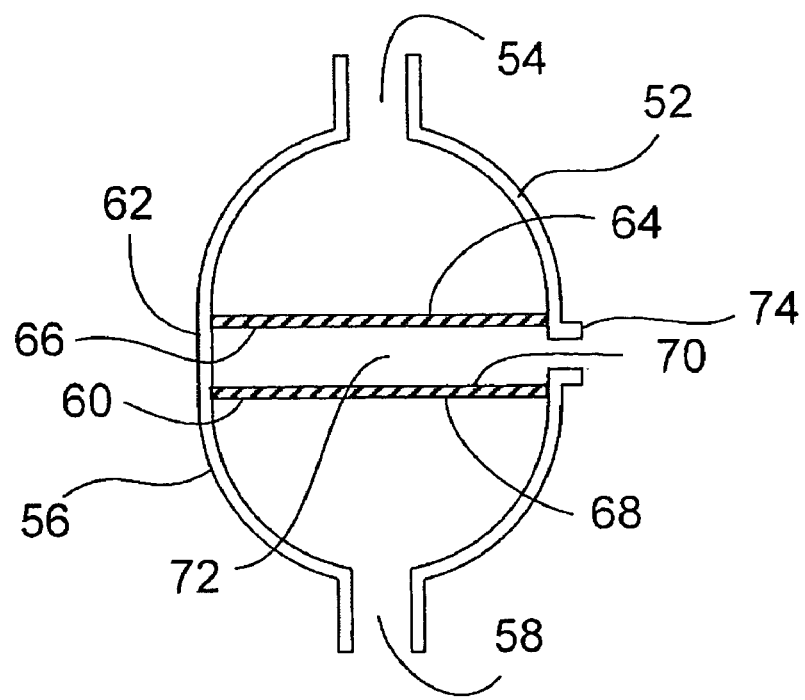
FIG. 5 shows a third embodiment of the present invention in cross-sectional view.

The device is assembled as shown in FIG. 5. All elements listed in FIG. 5 are the same as those in FIGS. 3 and 4 above. The filters or membranes can be retained within the device by a variety of methods as are known in the art including but not limited to heat or solvent bonding of the membrane or filter to the upper 66 and lower 70 surfaces of the spacer 62. They may also be secured by an overmolding technique if desired.

FIG. 6A shows the normal flow through the device. Fluid enters the inlet 54 flows through the first filter layer 64 into chamber 72 then through the second filter layer 68 and then out through outlet 58. In this mode, the port 74 is closed off with a cap 76A as shown although other devices such as valves or plugs (not shown) may be used as well.

FIG. 6B shows how the first layer 64 is integrity tested. Here the first filter layer 64 is wetted with a suitable liquid for the fluid such as a gas or gases or other liquid to be used. The outlet 58 is then closed by cap 76B and the port 74 is opened and connected to a suitable detection device (not shown). One or more selected fluids are flowed through the inlet 54 at a predetermined pressure or series of pressures, through the wetted membrane 64 and into chamber 72. The fluid then flows out the port 74 and the change in flow or fluid concentration is measured by the detection device that has been coupled to the port 74. An integrity value of the first layer is determined from the test results and it either passes or fails.

FIG. 6c shows how the second layer 68 is integrity tested. Here the second filter layer 68 is wetted with a suitable liquid for the fluid such as a gas or gases or other liquid to be used. The inlet 54 is then closed by cap 76C and the port 74 is opened and connected to a suitable detection device (not shown). One or more selected fluids are flowed through the outlet 58 at a predetermined pressure or series of pressures, through the wetted membrane 68 and into chamber 72. The fluid then flows out the port 74 and the change in flow or fluid concentration is measured by the detection device that has been coupled to the port 74. An integrity value of the first layer is determined from the test results and it either passes or fails.

If all layers pass the device is ready for use. As described above, the same or similar test may be repeated if desired after use to ensure integrity of the device through its use.

FIG. 7 shows another embodiment of the present invention. The core 102 has an outlet 104 formed on one end 106. The core 102 extends into the interior of the cartridge 108 and is sealed at the top 110. The core 102 has a series of openings 112 formed in a portion of its side wall(s). The core 102 is in fluid communication with interior of the cartridge 108 and the outlet 104.

Arranged concentrically around the core 102 is a first membrane layer 120. The first layer 120 is preferably cylindrical in shape although other cross-sectional shapes such as oval, triangular or polygonal can be used. Preferably the membrane layer 120 is pleated to increase the available surface area. The first membrane layer 120 is sealed along its vertical edges(not shown), preferably by a seam (not shown) as is well-known in the art. The top horizontal surface 128 of the membrane is sealed to a first end cap 130 such as by polymer adhesion, solvent bonding, adhesives or overmolding. Likewise the bottom horizontal surface 132 of the membrane 120 is sealed to a second end cap 134 such as by polymer adhesion, solvent bonding, adhesives or overmolding.

Arranged concentrically outside around the first membrane layer 120 but spaced apart from it is a second membrane layer 140. The second layer 140 is preferably cylindrical in shape although other cross-sectional shapes such as oval, triangular or polygonal can be used and it preferably the same shape as the first layer 120. Preferably the second membrane layer 140 is pleated to increase the available surface area. The second membrane layer 140 is sealed along its vertical edges (not shown), preferably by a seam (not shown) as is well-known in the art. The top horizontal surface 148 of the membrane 140 is sealed to a first end cap 150 such as by polymer adhesion, solvent bonding or adhesives. Likewise the bottom horizontal surface 152 of the membrane 140 is sealed to a second end cap 154 such as by polymer adhesion, solvent bonding or adhesives.

As shown, the inner edges of the first and second endcaps 130, 134 of the first membrane layer 120 are liquid tightly sealed to the respective outer surfaces of the core 102. The inner edges of the first and second endcaps 150, 154 of the second membrane layer 140 are liquid tightly sealed to the respective outer surfaces of the first and second endcaps 130, 134 of the first membrane layer 120. Arranged concentrically outward and around the second membrane layer 140 is a porous cartridge housing 160 that is liquid tightly sealed to the outer edges of the endcaps 150, 154 of the second membrane layer 140 and which acts as an inlet to the device. In this manner, liquid which enters the housing 160 must flow through the first and then the second membrane layers 120, 140 before entering the core 102 and leaving the filter through the outlet 104.

Located in the space between the first layer 120 and the second layer 140 is a port 156 that allows for the integrity testing of each layer individually when in an assembled form. The method of doing so is similar to the methods described above for the embodiments of FIGS. 2A-C and 6A-C.

FIG. 8 is an embodiment of the device of FIG. 7 in which a third filter layer 200 is added concentrically outward from the second layer but inward of the outer housing 160. A second port 202 is located in the housing between the second layer 140 and the third layer 200 and in fluid communication with the space 204 between the two layers 140 and 200.

To test the third layer 200 of membrane, one closes port 156 and the outlet 104 as described herein above. The third layer is wetted by introducing a liquid to it through either the porous housing wall 160 or the port 202. A fluid such as a gas or gases or a liquid as described above can be flowed through the housing wall 160, the third layer 200 and out port 202 to a suitable detector.

FIGS. 9A-C show another embodiment of the present invention. In this embodiment, the device 210 is a flat sheet filtration device formed of two areas of filters 212 and 214, each of which is capable of being independently tested for integrity in the device 210. The device has a housing 216 containing an inlet 218, an outlet 220, an intermediate port 222 and a central core 224. As shown, the first area of filters 212 are selectively sealed to non-porous supports 226 arranged in the housing 216 to create a flow path between the inlet 218 and the core 224 through the filters 212. Likewise the second area of filters 214 are selectively sealed to non-porous supports 226 arranged in the housing 216 to create a flow path between the core 224 or intermediate port 222 through the filters 214 to the outlet 220.

In a normal usage as shown by FIG. 9A, fluid flows in through the inlet 218, then through the first areas of filters 212 into the central core 224. Intermediate port 222 is closed during this operation. The fluid then flows through the second filter area 214 and out the outlet 220.

To test the integrity of the first area of filters 212, the outlet 220 is closed and the port 222 is opened as shown in FIG. 9B. The filters are wet and then at least one fluid (gas or liquid) is applied to the filter area 212 through the inlet 218 at the desired pressure(s) and a detector for the flow of concentration change is mounted downstream of the port 222 to detect the change and provide one with a value.

To test the integrity of the second area of filters 214, the inlet 218 is closed and the port 222 is opened as shown in FIG. 9C. The filters are wet and then at least one fluid (gas or liquid) is applied to the filter area 214 through the outlet 220 at the desired pressure(s) and a detector for the flow of concentration change is mounted downstream of the port 222 to detect the change and provide one with a value.

FIGS. 10 and 11 show another embodiment of a serial filtration device using flat sheets of filters. The design can be a stacked flat sheet arrangement as in known in the art such as but not limited to, Prostak® and Pellicon® cassette systems available from Millipore Corporation of Billerica, Mass. In FIG. 10 a single cassette is shown. It comprises an inlet manifold 250, a first filter layer 252, an intermediate spacer layer 254 with a port 256, a second filter layer 258 and an outlet manifold 260, all sealed together into a single unit. The integrity of each layer is tested in the manner mentioned above with the other embodiments by selectively sealing off one of the inlet 250 or outlet 260 and opening the port 256.

FIG. 11 shows a typical two cassette system using the present invention. To the extent the elements are the same as in FIG. 10 the same reference numbers have been used. Each unit is stacked adjacent to each other and designed so that the inlets and outlets align with each other. Each unit has its own port 256 that services the filters within the unit. A plurality of these units can be stacked together into a common holder with a common inlet and outlet and used as a multi-cassette style system as is well known in the industry.

In devices containing three or more layers, there should be a port between each layer of filter. In this way, the ports on each side of the layer to be tested are used as the inlet and the outlet for the integrity test. Optionally, in another embodiment of the present invention, a device can be made with one valve that is used to open or close a chamber that connects to ports between several layers, so that a stack of several membrane pairs can be tested at once.

Thus with the present invention one can integrity test an infinite number of layers in a device by providing a selectively openable and closable port between each of the layers that provides for the integrity testing of each layer independently in an integral serial filtration device.

The device and methods of the present invention can be used with any filter media of any size that is capable of being integrity tested using gases or liquids. The membrane may be a microporous, ultrafiltration (UF), nanofiltration or reverse osmosis membrane formed of a polymer selected from olefins such as polyethylene including ultrahigh Molecular weight polyethylene, polypropylene, EVA copolymers and alpha olefins, metallocene olefinic polymers, PFA, MFA, PTFE, polycarbonate, vinyl copolymers such as PVC, polyamides such as nylon, polyesters, cellulose, cellulose acetate, regenerated cellulose, cellulose composites, polysulfone, polyethersulfone (PES), polyarylsulfone, polyphenylsulfone, polyacrylonitrile, polyvinylidene fluoride (PVDF), and blends thereof. The membrane selected depends upon the application, desired filtration characteristics, particle type and size to be filtered and the flow desired.

The other filter components such as end caps, inlets, outlets, housings, cores, ports, valves, etc., can be made of a variety of materials, such as metal, ceramic, glass or plastic. Preferably, the components are formed of plastics, more preferably thermoplastics, such as polyolefins, especially polyethylene and polypropylene, homopolymers or copolymers thereof, ethylene vinyl acetate (EVA) copolymers; polysulfones, polyethersulfone (PES), polyarylsulfone, polyphenylsulfone, polycarbonates; styrenes; PTFE resin; thermoplastic perfluorinated polymers such PFA; nylons and other polyamides; PET and blends of any of the above.

EXAMPLE

A device made according to the embodiment of FIG. 3 using a PES ultrafiltration membrane available from Millipore Corporation was made.

Both top and bottom layers of membrane were wet with water, the port was opened and the outlet was closed by inserting a plug. Air at 75 psi was flowed through the inlet to the filter layer and a flow meter that was positioned downstream of the port to read the flow. The results were <0.01 cc/min.

To test the second layer, the port was opened and the inlet was closed by inserting a plug. Air at 75 psi was flowed through the outlet to the filter layer and a flow meter that was positioned downstream of the port to read the flow. The results were <0.01 cc/min.

The recommended value for the membranes as supplied by the vendor was <0.01 cc/min. As the measured value for each layer was within this range, each layer and the device as a whole was determined to be integral.

What we claim:

1. A filtration device having two or more layers of filtration material, wherein each layer of the two or more layers of filtration material is capable of being independently tested for integrity, the device comprising a porous core having a closed end and an outlet at the other end, a first layer of filtration material arranged concentrically outward from the core and at least one additional layer of filtration material arranged concentrically outward from the first layer forming a space between the first and at least one additional layer, an outer porous cover layer concentrically arranged around the at least one additional layer, the core, the cover layer and first and at least one additional layer all being liquid tightly sealed together, a port arranged in the space between the first and at least one additional layer, the port being in fluid communication with the space and outside of the device.

2. The device of claim 1, wherein at least one layer of the two or more layers of filtration material is pleated.

3. The device of claim 1, wherein the core is a material selected from the group consisting of metal, ceramic, glass or plastic.

4. The device of claim 1, wherein the core is a material selected from the group consisting of thermoplastics, polyolefins, polyethylene, polypropylene, ethylene vinyl acetate (EVA) copolymers, polysulfones, polyethersulfone (PES), polyarylsulfone, polyphenylsulfone, polycarbonates, styrenes, PTFE resin, thermoplastic perfluorinated polymers, PFA, nylon, polyamides, PET and blends thereof.

5. The device of claim 1, wherein the filtration material is selected from the group consisting of microporous, ultrafiltration (UF), nanofiltration and reverse osmosis membranes.

6. The device of claim 5, wherein the filtration material is a material selected from the group consisting of polyolefins, polyethylene, ultrahigh molecular weight polyethylene, polypropylene, EVA copolymers, alpha olefins, metallocene olefinic polymers, PEA, MFA, PTFE, polycarbonate, vinyl copolymers, PVC, polyamides, nylons, polyesters, cellulose, cellulose acetate, regenerated cellulose, cellulose composites, polysulfone, polyethersulfone (PES), polyarylsulfone, polyphenylsulfone, polyacrylonitrile, polyvinylidene fluoride (PVDF), and blends thereof.

* * * * *